(12) United States Patent
Stoeckl et al.

(10) Patent No.: US 9,617,964 B2
(45) Date of Patent: Apr. 11, 2017

(54) STARTING DEVICE FOR AN INTERNAL COMBUSTION ENGINE

(75) Inventors: Rainer Stoeckl, Schwieberdingen (DE); Patrick Hallas, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 449 days.

(21) Appl. No.: 14/113,468

(22) PCT Filed: Apr. 13, 2012

(86) PCT No.: PCT/EP2012/056784
§ 371 (c)(1),
(2), (4) Date: Nov. 18, 2013

(87) PCT Pub. No.: WO2012/146495
PCT Pub. Date: Nov. 1, 2012

(65) Prior Publication Data
US 2014/0060472 A1    Mar. 6, 2014

(30) Foreign Application Priority Data

Apr. 26, 2011   (DE) .................. 10 2011 017 534

(51) Int. Cl.
*F02N 15/06* (2006.01)
*F02N 15/00* (2006.01)
(Continued)

(52) U.S. Cl.
CPC ......... *F02N 15/062* (2013.01); *F02N 15/006* (2013.01); *F02N 15/065* (2013.01);
(Continued)

(58) Field of Classification Search
CPC .... F02N 15/062; F02N 15/006; F02N 15/065; F02N 15/10; F02N 11/00;
(Continued)

(56) References Cited

U.S. PATENT DOCUMENTS 1,971,740 A * 8/1934 Whitney ............... F02N 15/065
74/7 B
2,710,606 A * 6/1955 Jenny ....................... F01B 3/00
123/179.31
(Continued)

FOREIGN PATENT DOCUMENTS

DE          69207927        7/1996
DE        102006051578      5/2008
(Continued)

OTHER PUBLICATIONS

International Search Report for Application No. PCT/EP2012/056784 dated Nov. 27, 2012 (English Translation, 3 pages).

*Primary Examiner* — Thomas Moulis
*Assistant Examiner* — Susan Scharpf
(74) *Attorney, Agent, or Firm* — Michael Best & Friedrich LLP

(57) ABSTRACT

A starting device for an internal combustion engine has a starter pinion which can be adjusted axially between an out-of-function position and an advanced drive position and is seated on a shaft, on which a securing ring is arranged in order to limit the axial movement of the starter pinion. A securing recess is made in the end side of the starter pinion, into which securing recess the securing ring protrudes and which fixes the securing ring radially in its position on the shaft. The starter pinion can be displaced axially into a removal position.

16 Claims, 5 Drawing Sheets

(51) Int. Cl.
*F02N 15/10* (2006.01)
*F02N 11/00* (2006.01)
*F02N 15/04* (2006.01)

(52) U.S. Cl.
CPC .............. *F02N 15/10* (2013.01); *F02N 11/00* (2013.01); *F02N 15/046* (2013.01); *F02N 15/063* (2013.01); *F02N 15/067* (2013.01); *Y02E 10/38* (2013.01)

(58) Field of Classification Search
CPC .... F02N 15/046; F02N 15/063; F02N 15/067; Y02E 10/38
USPC ............ 123/179.25; 29/893.2, 893.1; 74/6–9
See application file for complete search history.

(56) References Cited

U.S. PATENT DOCUMENTS

| | | | | |
|---|---|---|---|---|
| 3,490,255 | A * | 1/1970 | Curtindale | B60R 25/002 70/239 |
| 4,330,713 | A * | 5/1982 | Greenwood | F02N 15/063 290/48 |
| 5,111,093 | A * | 5/1992 | Tanaka | F02N 15/00 277/562 |
| 6,237,432 | B1 * | 5/2001 | Vilou | F02N 15/025 192/66.22 |
| 7,721,613 | B2 * | 5/2010 | Halbin | B25B 27/20 74/6 |
| 2004/0112319 | A1 * | 6/2004 | Hnilica | F02N 15/066 123/179.25 |
| 2006/0230599 | A1 * | 10/2006 | Mori | G11B 17/0287 29/603.03 |
| 2009/0038436 | A1 * | 2/2009 | Saito | F02N 11/00 74/7 E |
| 2009/0133531 | A1 * | 5/2009 | Ono | F02N 15/023 74/7 C |
| 2013/0087015 | A1 * | 4/2013 | Koudu | F02N 15/062 74/7 A |
| 2013/0291681 | A1 * | 11/2013 | Kaneda | F02N 11/00 74/7 A |
| 2014/0060472 | A1 | 3/2014 | Stoeckl et al. | |

FOREIGN PATENT DOCUMENTS

| | | |
|---|---|---|
| DE | 102008000883 | 10/2009 |
| DE | 102008054979 | 6/2010 |
| EP | 2172645 | 4/2010 |
| JP | 58108270 | 7/1983 |
| JP | 60114274 | 8/1985 |
| JP | 62047771 | 3/1987 |
| JP | H06213114 | 8/1994 |
| JP | 2007071164 | 3/2007 |

\* cited by examiner

STARTING DEVICE FOR AN INTERNAL COMBUSTION ENGINE

BACKGROUND OF THE INVENTION

The invention relates to a starting device for an internal combustion engine.

DE 10 2008 000 883 A1 describes a starting device for an internal combustion engine in which a starter pinion can be adjusted axially between a retracted, non-functional position and an advanced drive position in which the starter pinion meshes with the toothed ring of an internal combustion engine. The starter pinion is seated on a pinion shaft which is set in rotation by means of a drive shaft. The pinion shaft including starter pinion is advanced axially by means of an engagement relay. The starter pinion is formed as a component separate from the pinion shaft, which component is coupled in a rotationally conjoint manner to the pinion shaft but is arranged in an axially displaceable manner on the pinion shaft. The starter pinion is supported via a disk spring on a shoulder of the pinion shaft, wherein, on the face side situated opposite the spring, a securing ring is arranged in an encircling groove in the shell surface of the pinion shaft, which securing ring limits the axial displacement movement of the starter pinion on the pinion shaft. To eliminate spreading of the securing ring, and thus the risk of the securing ring becoming detached, at high rotational speeds, the securing ring is engaged over by a recess in the face side of the starter pinion, wherein there is additionally inserted into the recess a securing element that engages radially over the securing ring.

For assembly, firstly the disk spring and subsequently the starter pinion must be pushed onto the pinion shaft. The securing ring is subsequently inserted into the groove in the shell surface of the pinion shaft. As a final step, the securing element is inserted into the recess in order to prevent the securing ring spreading at high rotational speeds.

SUMMARY OF THE INVENTION

The invention is based on the object of limiting the axial movement of a starter pinion in a starting device for an internal combustion engine using simple design measures.

The starting device according to the invention is used for starting an internal combustion engine. Said starting device may be a starter with free throw-out action or a claw-type starter. The starter pinion can be adjusted axially between a non-functional position and an advanced drive position in which the starter pinion is in engagement with a toothed ring of an internal combustion engine. The starter pinion is arranged so as to be axially displaceable relative to a driving component in order to be able to perform the advancing movement. The driving component may in particular be a drive shaft that is set in rotation by an electric starter motor.

The starter pinion is supported axially relative to the driving component by means of a spring element such that the impetus during the advancing movement and a tooth-on-tooth impact against the toothed ring of the internal combustion engine is significantly reduced. The spring element exerts an axial spring force on the starter pinion, wherein, in the event of the tooth-on-tooth impact, the spring element is compressed and energy is stored in the spring element. Upon meshing into the toothed ring, the starter pinion can advance axially under the action of the stored spring force until the final starting position is reached.

In one expedient embodiment, the starter pinion is in the form of a plug-on pinion which can be pushed onto a pinion shaft, wherein in the mounted position the starter pinion is rotationally conjointly coupled to the pinion shaft but can perform an axial relative movement. The pinion shaft is caused to perform the rotational movement, in order to start the internal combustion engine, by the motor-driven drive shaft.

To limit the axial movement of the starter pinion, there is seated on the shaft a securing ring which forms an abutment for the starter pinion. To prevent the securing ring spreading, and becoming detached from the shaft, at high rotational speeds, there is formed into the face side of the starter pinion a securing recess into which the securing ring projects. The securing ring is fixed radially in its position on the shaft by the wall, which engages over said securing ring, of the securing recess in the starter pinion.

In the starting device according to the invention, the starter pinion can be displaced axially into a removal position in which the securing ring is situated axially outside the securing recess, such that the securing ring can be expanded radially. This is of significance in particular for assembly purposes, because it is normally necessary for the securing ring to be pushed onto the shaft which holds it, and to be removed from the shaft in order to be exchanged, in the expanded state. To be able to realize the expansion of the securing ring in a simple manner, the starting device is structurally designed such that the starter pinion can be adjusted into an axial removal position in which the radial expansion of the securing ring is possible without hindrance by the wall, which engages over said securing ring, of the securing recess. Said embodiment makes it possible for the securing ring to be mounted and exchanged without the need for additional components on the starter pinion or on the securing recess, such as is the case in the prior art where an additional annular securing element must be subsequently inserted into the securing recess on the face side of the starter pinion in order to limit the radial expansion of the securing ring. In the embodiment according to the invention, it is possible to dispense with an annular securing element of said type, such that, overall, a structurally simple embodiment is obtained. It is necessary merely to ensure that the starter pinion can be displaced axially into the removal position.

There are basically different possibilities for realizing the positioning of the securing ring axially outside the securing recess in the removal position. On the one hand, it is possible for the securing ring to be positioned axially in front of the face side of the starter pinion in the removal position. This structurally simple embodiment requires merely that, to attain the removal position, the starter pinion is displaced axially to such an extent that the securing ring is positioned axially in front of the face side of the starter pinion, such that a radial expansion of the securing ring is readily possible.

In an alternative embodiment, it is provided that, within the starter pinion, the securing recess is adjoined by a removal recess which has a larger diameter than the securing recess, such that the securing ring can be radially expanded even when the securing ring is situated within the starter pinion. The removal recess expediently directly adjoins the face side of the starter pinion and, like the securing recess, is of annular form. This embodiment has the advantage that the starting device can be of small construction in the axial direction, because the structural space required for attaining the removal position is situated within the axial extent of the starter pinion. Here, the axial extent of the removal recess may correspond at least approximately to the thickness of the securing ring, wherein, if appropriate, a smaller axial extent of the removal recess may also be provided such that, when the removal position is attained, the securing ring projects partially beyond the face side of the starter pinion. It is basically also possible for the removal recess to have an axial extent greater than the thickness of the securing ring.

The securing recess expediently has a diameter dimensioned such that an annular gap is formed between the outer side of the securing ring and the inner side of the securing recess. It is however also possible to provide a diameter dimensioned such that the outer side of the securing ring is in contact with the inner side of the securing recess.

To attain the removal position, the starter pinion must expediently be displaced counter to the force of the spring element. It is thus ensured that, when no external force acts, the starter pinion is thrust forward axially into the securing position, in which the securing ring is situated within the securing recess in the starter pinion, by the force of the spring element. For the axial securing action, there may be formed into the shell surface of the shaft an encircling groove into which the securing ring is inserted. The securing recess that engages around the securing ring prevents a situation in which, at high rotational speeds, the securing ring, as a result of expansion, springs out of the groove and becomes detached from the shaft.

BRIEF DESCRIPTION OF THE DRAWINGS

Further advantages and expedient embodiments will emerge from the further claims, from the description of the figures, and from the drawings, in which:

DETAILED DESCRIPTION

Figure 1:
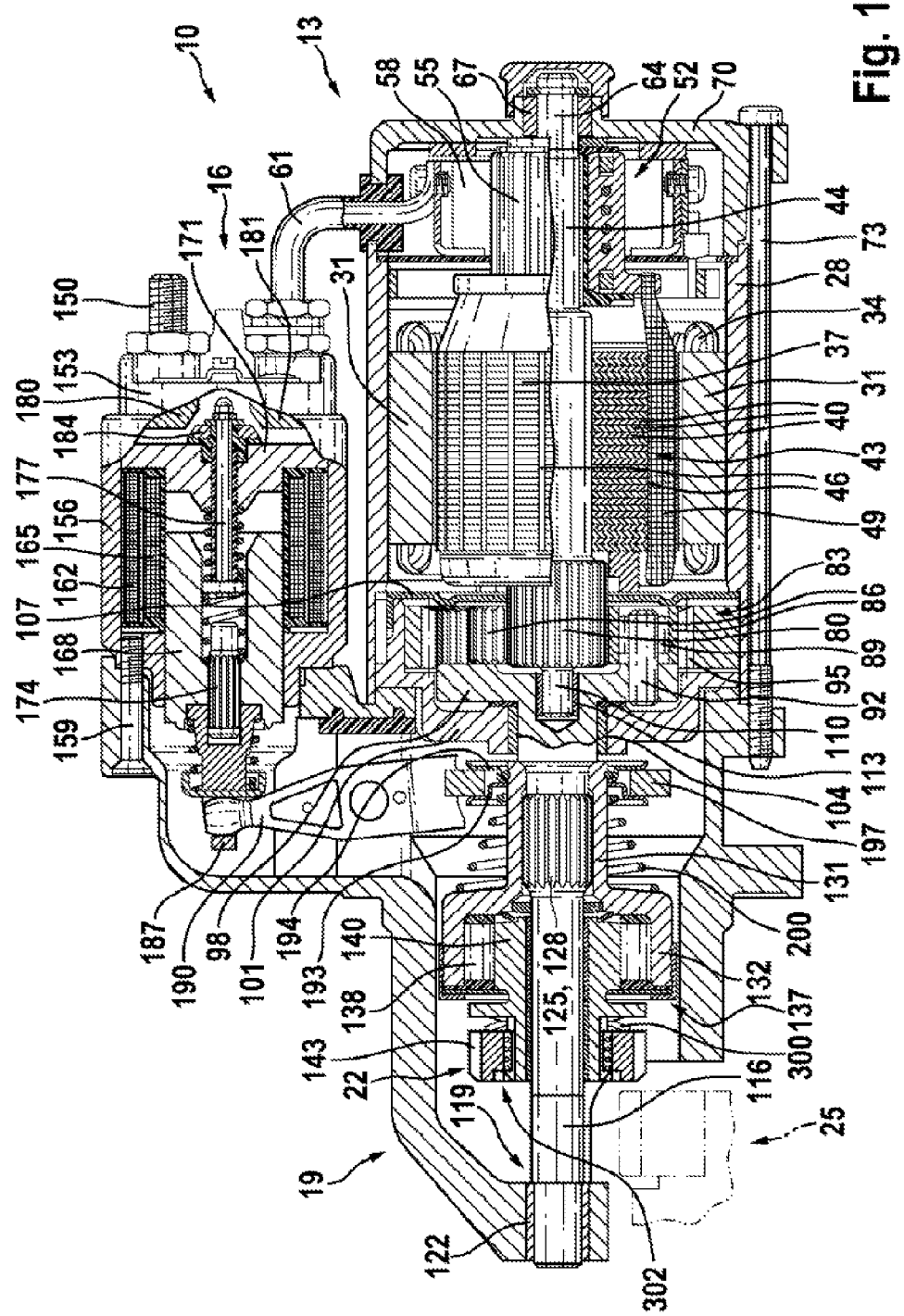
FIG. 1 shows a starter for an internal combustion engine in a longitudinal section.

In the figures, identical components are denoted by the same reference numerals.

FIG. 1 illustrates a starting device 10 in longitudinal section. The starting device 10 has, for example, a starter motor 13 and an engagement relay 16. The starter motor 13 and the engagement relay 16 are fastened to a common drive bearing bracket 19. The starter motor 13 serves functionally to drive a cranking or starter pinion 22 when the latter is meshed into the toothed ring 25 of the internal combustion engine (not illustrated here).

The starter motor 13 has, as a housing, a pole tube 28 which, on its inner circumference, bears pole shoes 31, with an excitation coil 34 being wound around each of the pole shoes. The pole shoes 31, in turn, surround an armature 37 which has an armature pack 43 constructed from laminations 40 and has an armature coil 49 arranged in grooves 46. The armature pack 43 is pressed onto a drive shaft 44. Furthermore, a collector or commutator 52 is mounted on that end of the drive shaft 44 which faces away from the cranking pinion 22, which collector or commutator is constructed inter alia from individual commutator laminations 55. The commutator laminations 55 are, in a known way, electrically connected to the armature winding 49 such that, when the commutator laminations 55 are electrically energized by means of carbon brushes 58, the armature 37 performs a rotational movement in the pole tube 28. When in an activated state, a power supply line 61 arranged between the engagement relay 16 and the starter motor 13 supplies power both to the carbon brushes 58 and also to the excitation coil 34. The drive shaft 44 is supported at the commutator side by way of a shaft journal 64 in a plain bearing 67 which, in turn, is held in a positionally fixed manner in a commutator bearing cover 70. The commutator cover 70 is in turn fastened in the drive bearing bracket 19 by means of tension rods 73 (screws, of which there are for example 2, 3 or 4) arranged so as to be distributed over the circumference of the pole tube 28. Here, the pole tube 28 is supported on the drive bearing bracket 19, and the commutator bearing cover 70 is supported on the pole tube 28.

In the drive direction, the armature 37 is adjoined by a so-called sun gear 80 which is part of a planetary gear set 83. The sun gear 80 is surrounded by multiple planet gears 86, normally three planet gears 86, which are supported on axle journals 92 by means of rolling bearings 89. The planet gears 86 roll in an internal gear 95 which is mounted, on the outside, in the pole tube 28. In the direction of the drive output side, the planet gears 86 are adjoined by a planet carrier 98 in which the axle journals 92 are received. The planet carrier 98 is in turn mounted in an intermediate bearing 101 and in a plain bearing 104 arranged therein. The intermediate bearing 101 is of pot-shaped form such that both the planet carrier 98 and also the planet gears 86 are accommodated therein. Also arranged in the pot-shaped intermediate bearing 101 is the internal gear 95, which is finally closed with respect to the armature 37 by means of a cover 107. The intermediate bearing 101 is also supported, by way of its outer circumference, on the inner side of the pole tube 28. The armature 37 has, on that end of the drive shaft 44 which faces away from the commutator 52, a further shaft journal 110 which is likewise received in a plain bearing 113. The plain bearing 113 is in turn received in a central bore of the planet carrier 98. The planet carrier 98 is connected in unipartite fashion to the drive output shaft 116. Said drive output shaft 116 is supported by way of its end 119, which faces away from the intermediate bearing 101, in a further bearing 122 which is fastened in the drive bearing bracket 19. The drive output shaft 116 is divided into different sections: Accordingly, the section which is arranged in the plain bearing 104 of the intermediate bearing 101 is followed by a section with a so-called straight toothing 125 (internal toothing) which is part of a so-called shaft-hub connection. Said shaft-hub connection 128 in this case permits axially rectilinear sliding of a driver 131. Said driver 131 is a sleeve-like projection which is in one piece with a pot-shaped outer ring 132 of the freewheel 137. Said freewheel 137 (ratchet) is furthermore composed of the inner ring 140 which is arranged radially within the outer ring 132. Clamping bodies 138 are arranged between the inner ring 140 and the outer ring 132. Said clamping bodies 138, in interaction with the inner ring and the outer ring, prevent a relative rotation between the outer ring and the inner ring in a second direction. In other words: the freewheel 137 permits a relative rotation between the inner ring 140 and outer ring 132 in only one direction. In the exemplary embodiment, the inner ring 140 forms the pinion shaft, which is formed as a separate component and on which the cranking or starter pinion 22, which has the helical toothing 143 (external helical toothing), is seated in a rotationally conjoint but axially adjustable manner. The cranking pinion 22 may alternatively also be in the form of a straight-toothed pinion. Instead of electromagnetically excited pole shoes 31 with excitation coil 34, use may also be made of poles excited by permanently magnetic means.

Between the cranking or starter pinion 22 and a radially widened collar of the pinion shaft 140, there is situated a spring element 300 which is for example in the form of a disk spring or helical spring and which supports the cranking or starter pinion 22 axially. The axial relative movement of the cranking or starter pinion 22 on the pinion shaft 140 is limited, on the face side facing away from the spring element 300, by an abutment device 302, which will be described in more detail in the following figures.

The meshing mechanism will be discussed below. The engagement relay 16 has a bolt 150 which is an electrical contact and which is connected to the positive terminal of an electrical starter battery (not illustrated here). Said bolt 150 is guided through a relay cover 153. Said relay cover 153 closes off a relay housing 156 which is fastened to the drive bearing bracket 19 by means of multiple fastening elements 159 (screws). Also arranged in the engagement relay 16 are a retraction coil 162 and a so-called holding coil 165. The retraction coil 162 and the holding coil 165 both generate, when in the activated state, an electromagnetic field that flows through the relay housing 156 (which is composed of electromagnetically conductive material), through a linearly movable armature 168 and through an armature return 171. The armature 168 bears a thrust rod 174 which, during the linear retraction of the armature 168, moves in the direction of a switching bolt 177. With said movement of the thrust rod 174 toward the switching bolt 177, the latter is moved out of its rest position in the direction of two contacts 180 and 181 such that a contact bridge 184 mounted on the end of the switching bolt 177 at the contacts 180 and 181 electrically connects the two contacts 180 and 181 to one another. In this way, electrical power is conducted from the bolt 150, across the contact bridge 184 to the power supply line 61 and thus to the carbon brushes 58. In the process, the starter motor 13 is energized.

The engagement relay 16 or the armature 168 furthermore has the task of moving, via a tension element 187, a lever which is arranged so as to be rotationally movable with respect to the drive bearing bracket 19. Said lever 190, normally in the form of a forked lever, engages by way of two prongs (not illustrated here) around two disks 193 and 194 at the outer circumference thereof, in order to move a driver ring 197, which is clamped between said disks, toward the freewheel 137 counter to the resistance of the spring 200, and thus mesh the cranking pinion 22 into the toothed ring 25.

Figure 2:
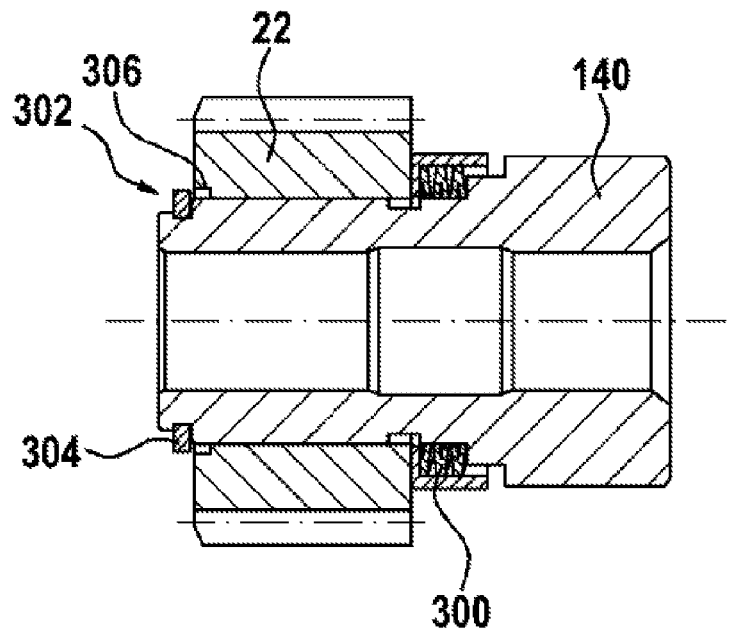
FIG. 2 shows a section through the starter pinion and the pinion shaft on which the starter pinion is seated, having a securing ring on the pinion shaft, which securing ring limits the axial forward thrust movement of the starter pinion, wherein the starter pinion is in a removal position in which the securing ring is situated axially in front of the face side of the starter pinion.
Figure 3:
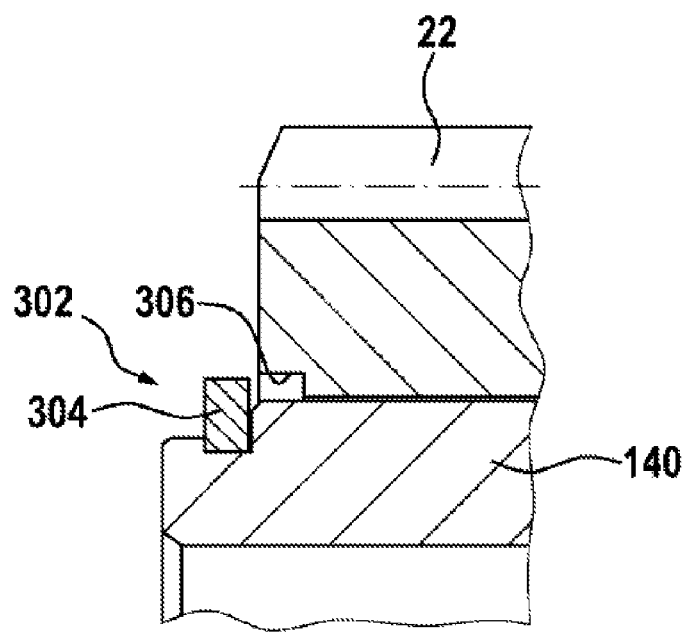
FIG. 3 shows, in an enlarged illustration, the region between the starter pinion and pinion shaft with the securing ring.

FIGS. 2 to 5 illustrate, in a first exemplary embodiment, the abutment device 302 by means of which the axial relative movement of the starter pinion 22 relative to the pinion shaft 140 is limited. The abutment device 302 comprises, on the side situated opposite the spring element 300, a securing ring 304, which is inserted into an encircling groove in the shell surface of the pinion shaft 140, and a securing recess 306, which is formed as an annular recess into that face side of the starter pinion which faces away from the spring element 300. In FIGS. 2 and 3, the starter pinion 22 has been adjusted axially counter to the force of the spring element 300 into a removal position in which the securing ring 304 is situated directly in front of the face side of the starter pinion 22, such that the securing ring 304 can be inserted into, or removed from, the groove in the shell surface of the pinion shaft 140.

Figure 4:
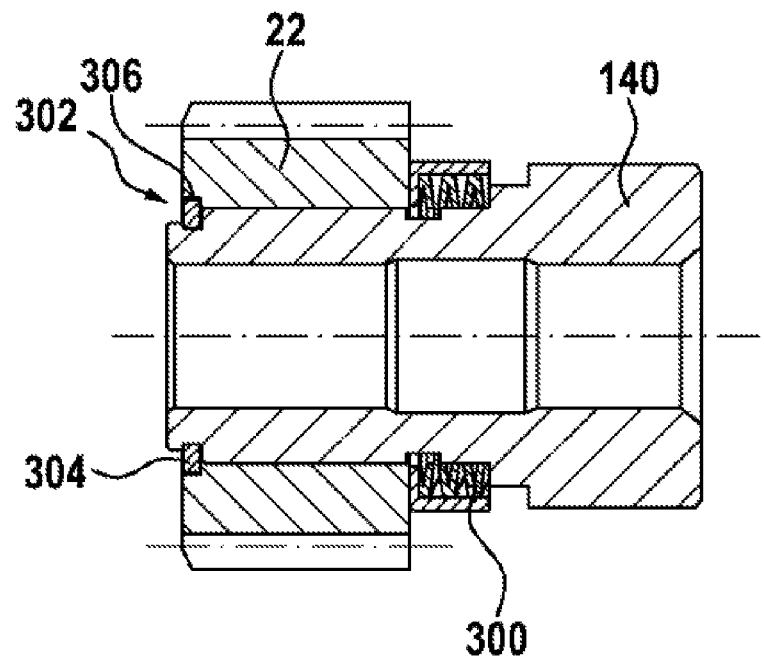
FIG. 4 is an illustration corresponding to FIG. 2, but the starter pinion is in the position in which it has been thrust forward by the force of a spring element and in which the securing ring is situated in a securing recess which is formed into the face side of the starter pinion.
Figure 5:
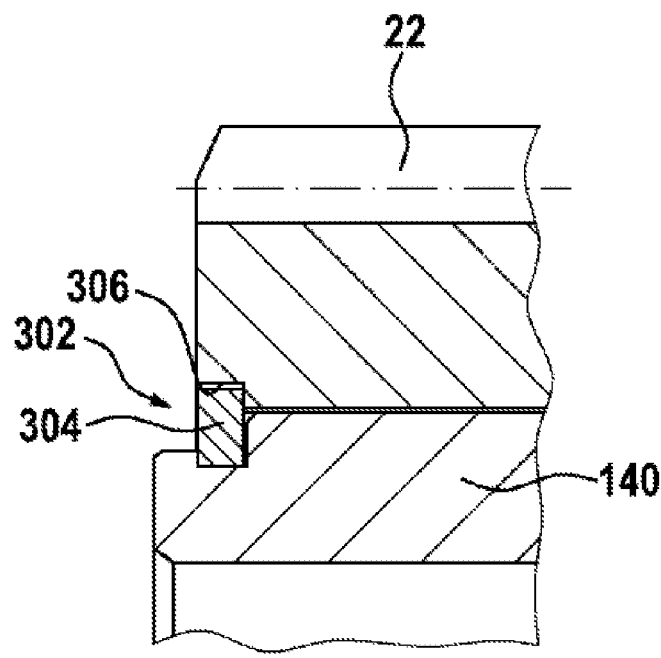
FIG. 5 shows, in an enlarged illustration, the starter pinion and the pinion shaft with the securing ring in the securing recess.
Figure 6:
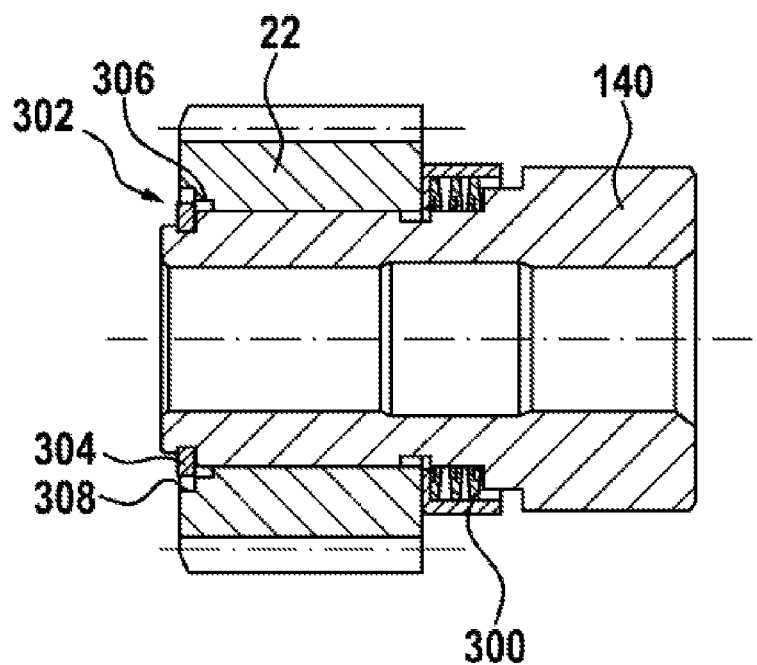
FIG. 6 to FIG. 9 show a further exemplary embodiment with illustrations as per FIGS. 2 to 5, but with an additional removal recess in the starter pinion, which removal recess directly adjoins the securing recess for receiving the securing ring.
Figure 7:
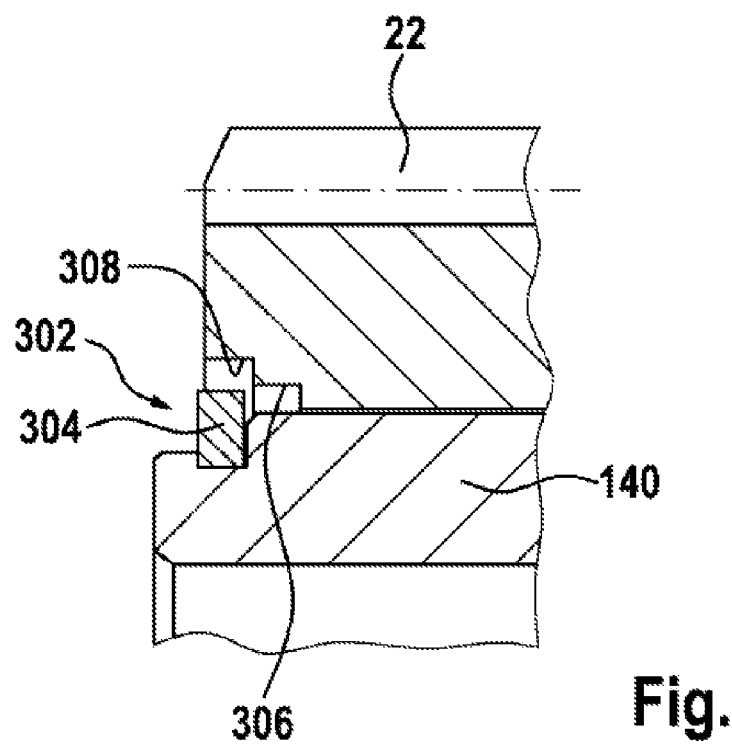
Figure 8:
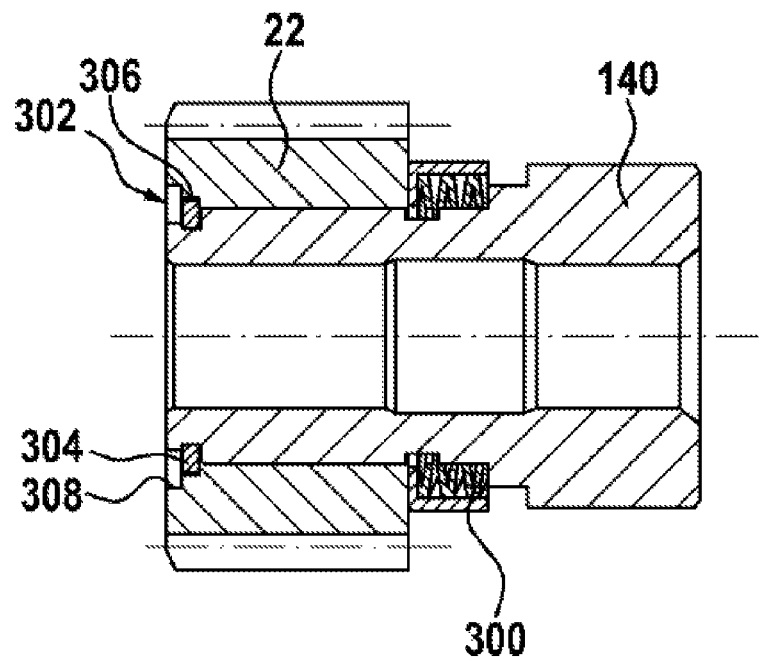
Figure 9:
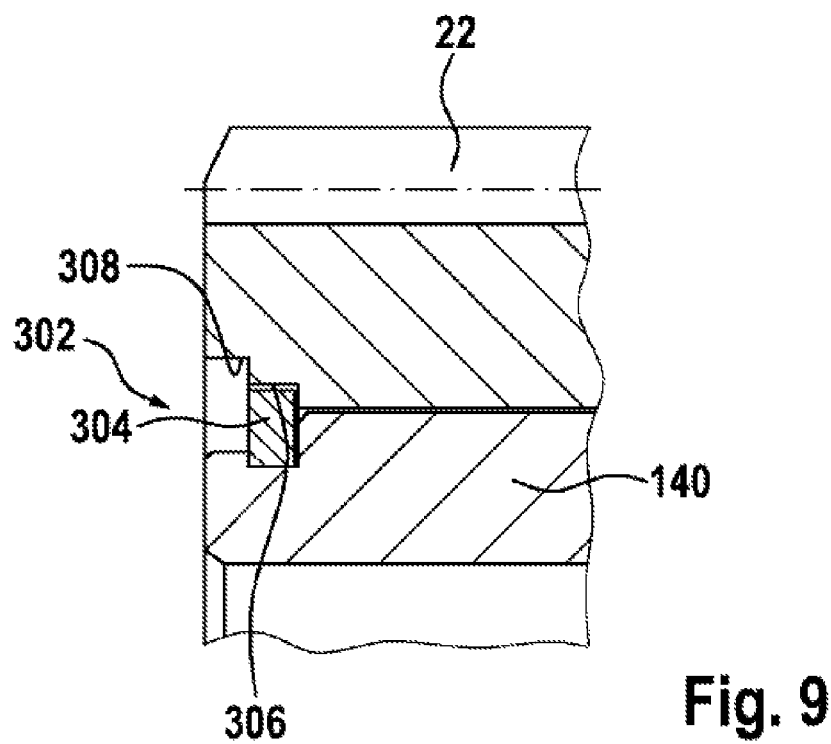

By contrast, in FIGS. 4 and 5, the starter pinion 22 is shown in the position in which it has been thrust forward axially by the force of the spring element 300 and in which the securing ring 304 is received in the securing recess 306 which is formed into the face side of the starter pinion 22. As can be seen from the enlarged illustration as per FIG. 5, in the abutment or securing position, the securing ring 304 is situated entirely in the securing recess 306. Between the radial outer surface of the securing ring 304 and the inner side, which engages radially around said securing ring, of the recess 306, there is situated a small annular gap, wherein, if appropriate, embodiments are also conceivable in which there is no annular gap, such that the outer side of the securing ring 304 is in direct contact with the inner wall of the securing recess 306.

FIGS. 6 to 9 illustrate a further exemplary embodiment for an abutment device 302 between the starter pinion 22 and a securing ring 304 on the pinion shaft 140. As in the preceding exemplary embodiment, the abutment device 302 comprises the securing ring 304, which is received in an encircling groove in the shell surface of the pinion shaft 140, and a securing recess 306 which is formed into the starter pinion 22, adjacent to the face side. In the abutment position as per FIGS. 8 and 9, the securing ring 304 is received entirely in the securing recess 306. In the removal position as per FIGS. 6 and 7, by contrast to the preceding exemplary embodiment, the securing ring 304 is not situated in front of the face side of the starter pinion 22 but rather is situated in a removal recess 308 which is likewise formed into the starter pinion 22 and which directly adjoins the face side of the starter pinion. The removal recess 308 is positioned axially directly in front of the securing recess 306 and has a larger diameter than the securing recess 306, such that, as can be seen in particular from FIG. 7, there is an adequate radial spacing between the securing ring 304 and the inner side of the removal recess 308 such that it is possible for the securing ring 304 to be radially expanded and removed from the groove in the shell surface of the starter pinion 140. This makes it possible for the securing ring 304 to be removed, and inserted into the groove in the shell surface of the pinion shaft, within the starter pinion 22.

What is claimed is:

1. A starting device for an internal combustion engine, having a starter pinion (22), which is adjustable axially between a non-functional position and an advanced drive position and which is seated on a shaft, having a securing ring (304) which is seated on the shaft and which serves for limiting axial movement of the starter pinion (22), wherein the securing ring (304) is configured to be spread and expanded radially for removal from the shaft, wherein there is formed into a face side of the starter pinion (22) a securing recess (306) into which the securing ring (304) projects and which fixes the securing ring (304) radially on the shaft to prevent the securing ring (304) from spreading, characterized in that the starter pinion (22) can be displaced axially into a removal position in which the securing ring (304) is situated axially outside the securing recess (306) and when removed from the securing recess (306), the securing ring (304) can be expanded radially.

2. The starting device as claimed in claim 1, characterized in that, in the removal position, the securing ring (304) is positioned axially in front of the face side of the starter pinion (22).

3. The starting device as claimed in claim 1, characterized in that the securing recess (306) is adjoined by a removal recess (308) which is formed into the starter pinion (22) and which has a larger diameter than the securing recess (306).

4. The starting device as claimed in claim 3, characterized in that the removal recess (308) is arranged in the starter pinion (22) directly adjacent to the face side.

5. The starting device as claimed in claim 3, characterized in that the removal recess (308) is of annular form.

6. The starting device as claimed in claim 3, characterized in that an axial extent of the removal recess (308) corresponds to a thickness of the securing ring (304).

7. The starting device as claimed in claim 1, characterized in that the starter pinion (22) can be displaced into the removal position counter to a force of a spring element (300).

8. The starting device as claimed in claim 1, characterized in that a groove for receiving the securing ring (304) is formed into the shaft.

9. The starting device as claimed in claim 1, characterized in that the starter pinion (22) is seated on a pinion shaft (140) and is mounted in an axially movable manner on the pinion shaft (140), wherein the securing ring (304) is arranged on the pinion shaft (140).

10. The starting device as claimed in claim 2, characterized in that the securing recess (306) is adjoined by a removal recess (308) which is formed into the starter pinion (22) and which has a larger diameter than the securing recess (306).

11. The starting device as claimed in claim 10, characterized in that the removal recess (308) is arranged in the starter pinion (22) directly adjacent to the face side.

12. The starting device as claimed in claim 11, characterized in that the removal recess (308) is of annular form.

13. The starting device as claimed in claim 12, characterized in that an axial extent of the removal recess (308) corresponds to a thickness of the securing ring (304).

14. The starting device as claimed in claim 13, characterized in that the starter pinion (22) can be displaced into the removal position counter to a force of a spring element (300).

15. The starting device as claimed in claim 14, characterized in that a groove for receiving the securing ring (304) is formed into the shaft.

16. The starting device as claimed in claim 15, characterized in that the starter pinion (22) is seated on a pinion shaft (140) and is mounted in an axially movable manner on the pinion shaft (140), wherein the securing ring (304) is arranged on the pinion shaft (140).

* * * * *